United States Patent Office 3,418,917
Patented Dec. 31, 1968

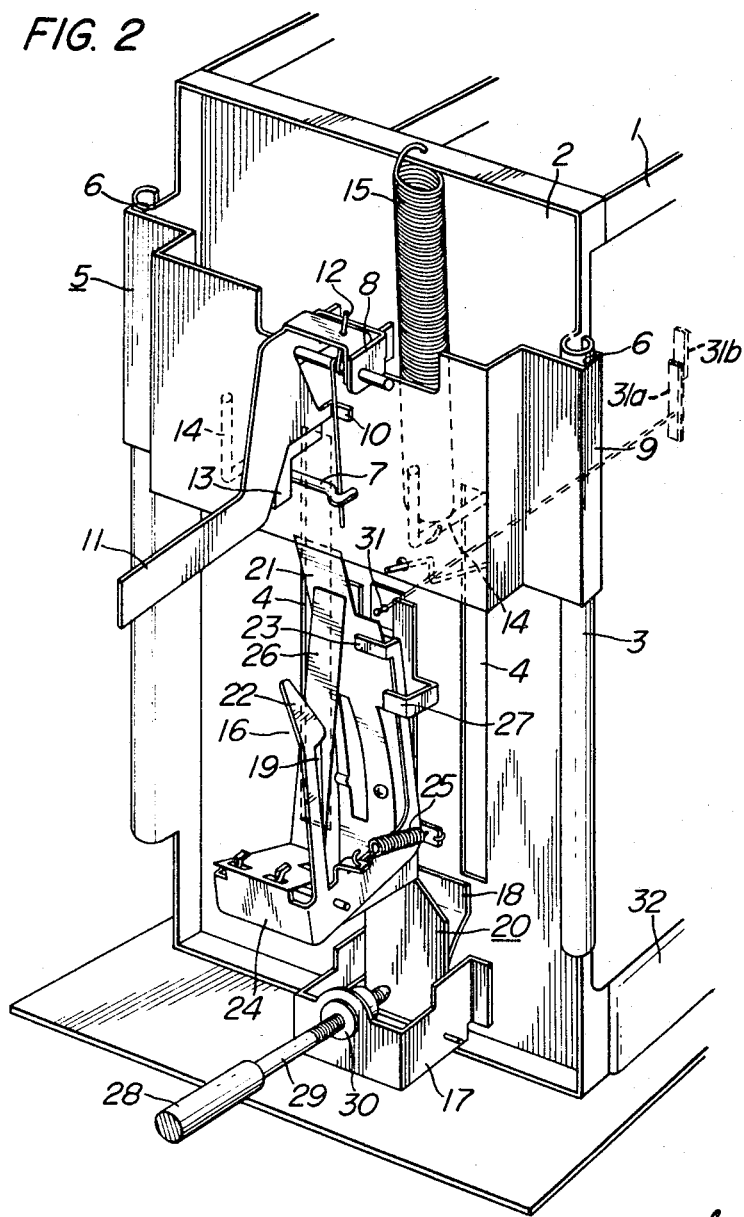

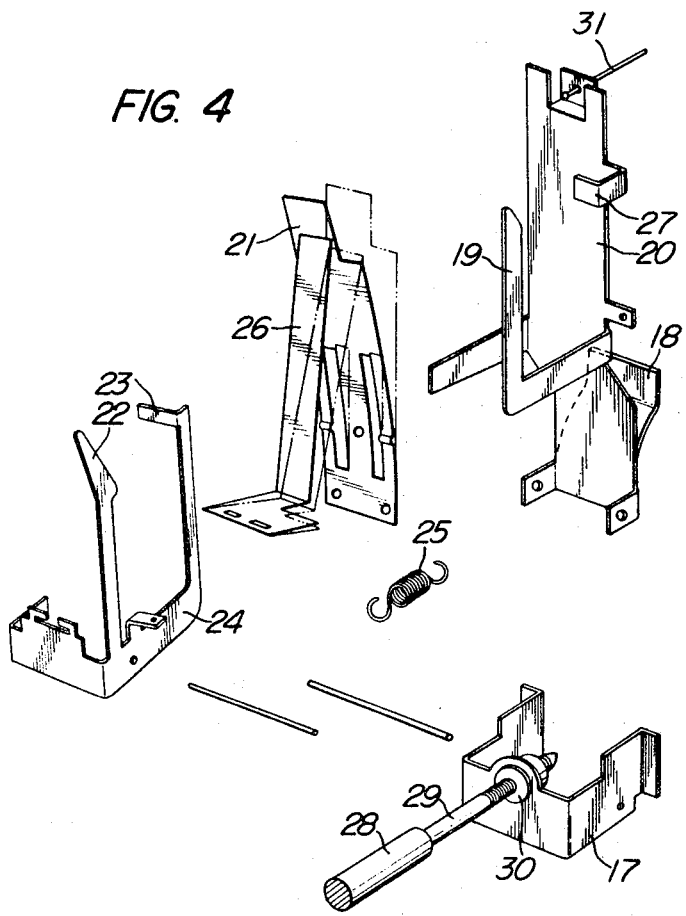

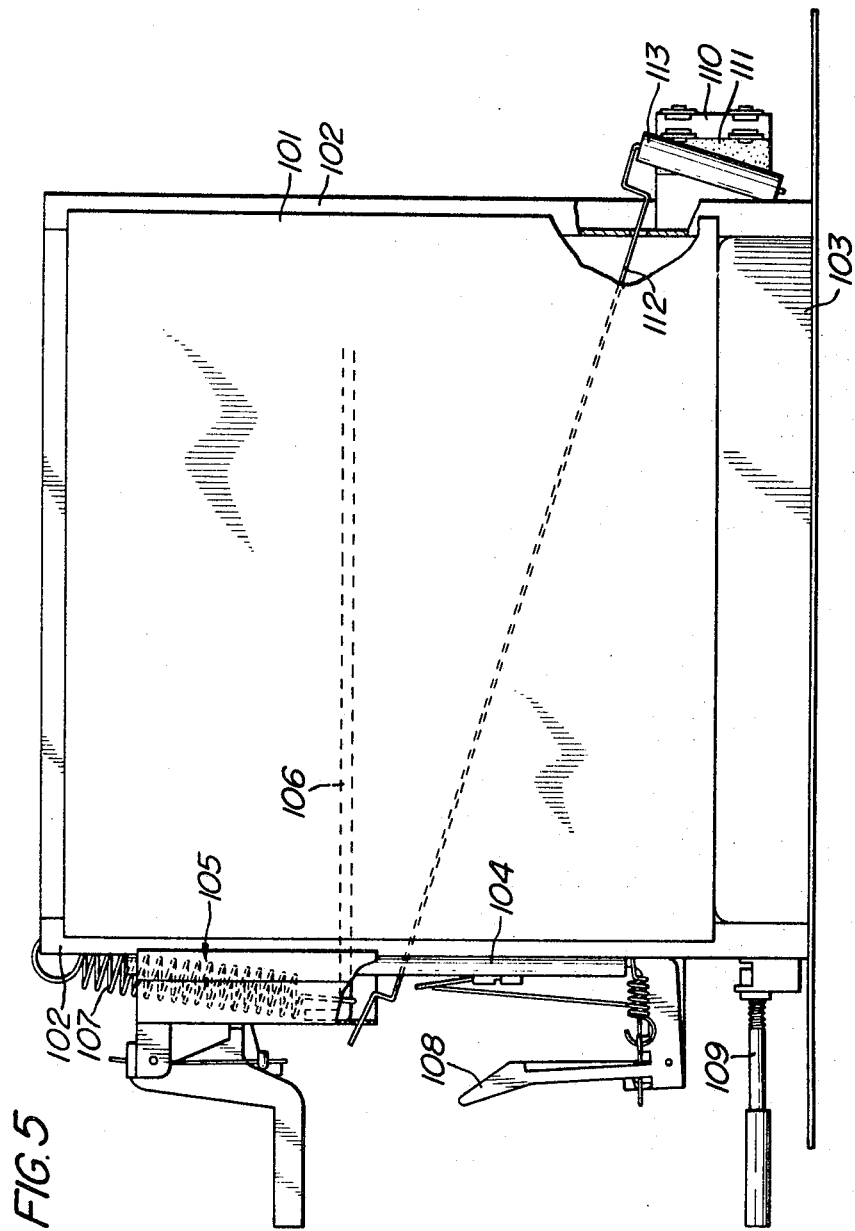

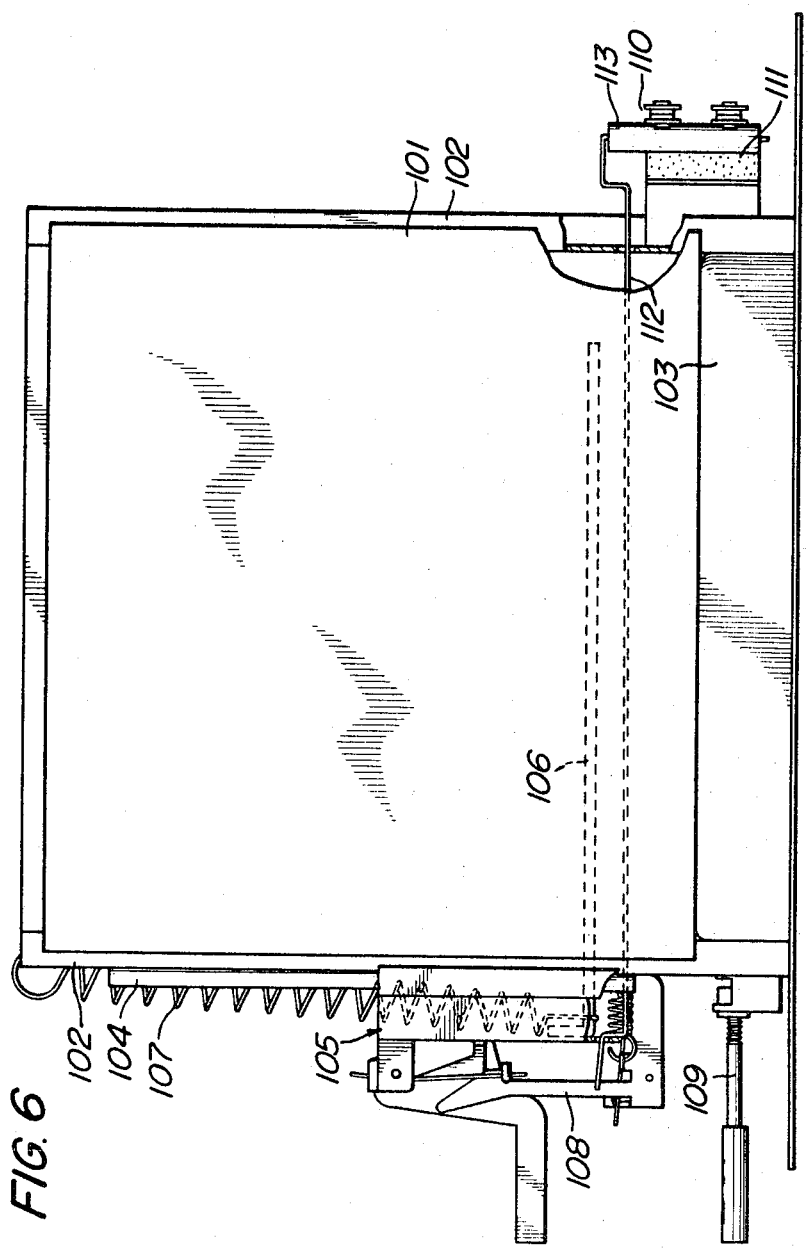

3,418,917
SEMI-AUTOMATIC POP-UP TOASTER
Hosei Sato, Nishinomiya-shi, Japan, assignor to Matsushita Electric Industrial Co., Ltd., Osaka, Japan, a corporation of Japan
Filed May 8, 1967, Ser. No. 636,950
Claims priority, application Japan, May 23, 1966, 41/33,423; 41/48,764; 41/48,758
4 Claims. (Cl. 99—329)

ABSTRACT OF THE DISCLOSURE

A toaster comprising bread support elevating means having an engaging member thereon and movable up and down between an elevated position and a lower toasting position, latch means having a hook thereon engageable with said bread support elevating means when it is in said lower toasting position for retaining it in said position, a rebound spring adapted to snap back and forth past a dead center position, said rebound spring being engaged by said latching means to move it in one direction past said dead center position when said bread support elevating means is lowered toward said lower toasting position, a bimetallic element for detecting the degree of toasting of bread toasted by the toaster, and an actuating rod coupled to said bimetallic element and engageable with said rebound spring. The actuating rod snaps the rebound spring back in the other direction past the dead center position as said bimetallic element moves in response to the degree of toasting, and the rebound spring and latch means are positioned so that the latching means is engaged by said rebound spring and disengaged from said bread support elevating means when said rebound spring snaps back in said other direction. The bread support elevating means, is thus released to permit its return to the elevated position.

---

The present invention relates to toasters. More specifically, the present invention relates to so-called semi-automatic pop-up type toasters wherein movement of a slice of bread to a toasting position is effected manually by depressing a bread support with the slice of bread thereon, while detection of completion of the toasting and the return movement of the bread support are effected automatically. The invention relates particularly to improvements in the device for latching the bread support elevating means in the bread toasting position and in the device for releasing said means from the latched position.

Most of the conventional semi-automatic pop-up type toasters are arranged such that the bread support elevating means is released from the latched bread toasting position by making use of the stretching or contraction of an extensible and contractable resistance wire after the final toasting temperature has been sensed by the bimetallic element. The toasters of the type described above, therefore, have the drawbacks firstly that not only is it very difficult to adjust the tension of the extensible and contractable resistance wire, but also there is a tendency for the extensible and contractable resistance wire to be subject to fatigue or breakage due to the continuous tension maintained therein; secondly that, since a toasting control means and a switch are provided at one end of an inner casing of the toaster, all the component parts associated therewith are predominantly disposed at that end of the toaster, presenting considerable problems in the designing as well as the assembling of the toaster; and finally that the provision of guide rods on the end plate for guiding the elevating means not only increases the number of parts and processes required for the production of the toaster but also makes poor utilization of the air space around the inner casing.

The present invention seeks to eliminate the aforementioned drawbacks of conventional toasters and to provide an easy handling toaster by providing guide means for the elevating means which is simple in construction and provides smooth operation of said elevating means, and by providing a proper arrangement of switch means.

An object of the present invention, therefore, is to provide a toaster in which deflection of a bimetallic element which senses the temperature in the bread toasting region is transmitted directly to a rebound spring actuating rod to open a power switch and release the bread support elevating means from the latched position, without using an extensible and contractable resistance wire, and which toaster therefore operates quickly and has simple construction, free from the drawbacks resulting from the use of an extensible and contractable wire, and which is durable and gives prolonged service.

Another object of this invention is to provide a toaster in which, by the provision of a simple mechanism which enables a switch to be disposed at the end of the toaster opposite to that at which the bread support elevating means is provided, various operational elements of the toaster are distributed evenly over the entire toaster structure instead of being gathered predominantly at one end, and which toaster is therefore easy to design and assemble and also is advantageous from the standpoint of appearance and convenience in use, and which does not require illogical wiring.

Still another object of the invention is to provide a toaster in which a portion of the flanges formed on an end plate of the inner casing is curled to provide cylindrical guides for bread support elevating means, whereby the number of parts is reduced, and as a result of which the cost is lowered and the operation is improved, and in which toaster, the air space between the elevating means and the end plate is effectively used by providing therein a complicated latch means.

The toaster which achieves these objects comprises bread support elevating means having an engaging member thereon and movable up and down between an elevated position and a lower toasting position, latch means having a hook thereon engageable with said bread support elevating means when it is in said lower toasting position for retaining it in said position, a rebound spring adapted to snap back and forth past a dead center position, said rebound spring being engaged by said latching means to move it in one direction past said dead center position when said bread support elevating means is lowered toward said lower toasting position, a bimetallic element for detecting the degree of toasting of bread toasted by the toaster, and an actuating rod coupled to said bimetallic element and engageable with said rebound spring. The actuating rod snaps the rebound spring back in the other direction past the dead center position as said bimetallic element moves in response to the degree of toasting. The rebound spring and latch means are positioned so that the latching means is engaged by said rebound spring and disengaged from said bread support elevating means when said rebound spring snaps back in said other direction, whereby said bread support elevating means is released to permit its return to the elevated position.

The inventon will now be described in conjunction with the acompanying drawings, in which the present invention is illustrated by way of example and in which:

FIG. 2 is a perspective view of the portion shown in FIG. 1;

FIG. 4 is an exploded view of the component parts of the critical portion; and

FIGS. 5 and 6 are side elevational views, partially broken away, of another embodiment of the invention, with an outer casing removed, FIG. 5 showing the toaster in a nontoasting position and FIG. 6 showing the same in a toasting position.

In the drawings, the same reference numerals designate similar parts.

Figure 1A:
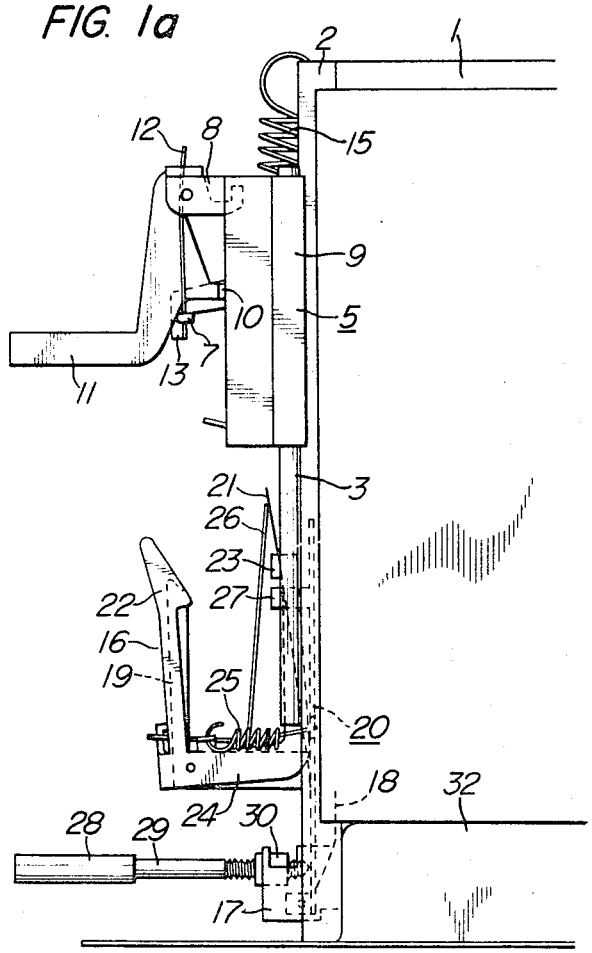
FIG. 1(a) is a side elevation of one end of a toaster according to the present invention with the outer cover removed and the bread support elevating means in the non-toasting position, that is, released position.
Figure 1B:
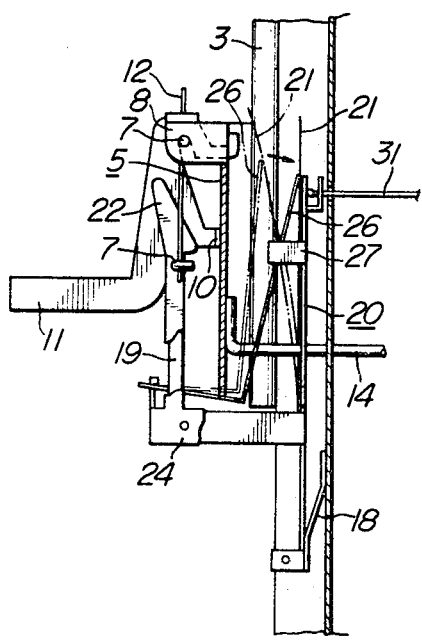
FIG. 1(b) is a partly sectional view of the bread support elevating means when it has been just pressed down to the undermost position of the stroke.
Figure 1C:
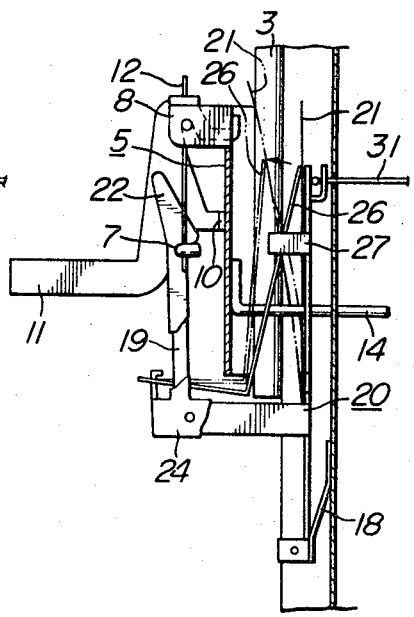
FIG. 1(c) is the same view as FIG. 1(b) except that the bread support elevating means is in latched position, that is, the toasting position.
Figure 3:
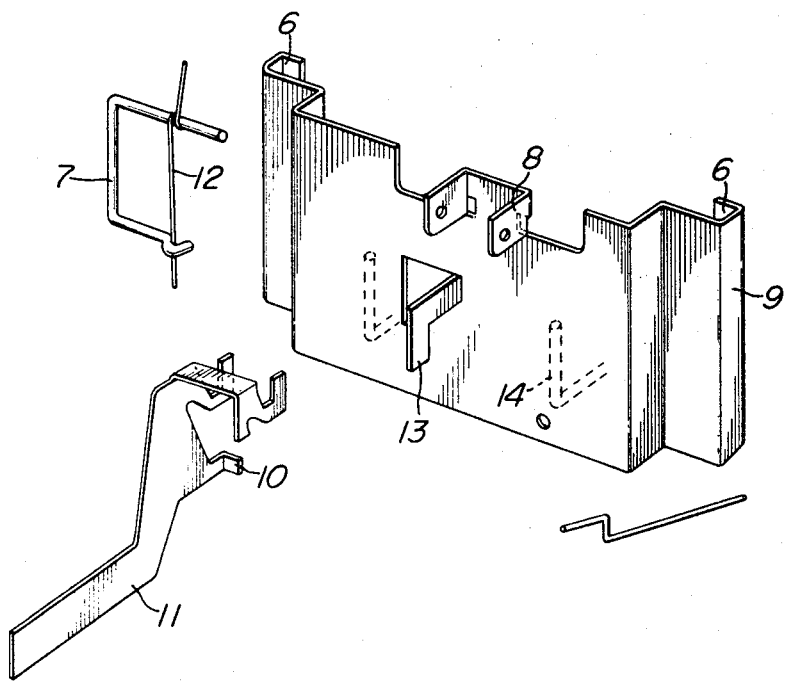
FIG. 3 is an exploded view of the bread support elevating means.

Referring first to FIGS. 1 to 4 illustrating a preferred embodiment of the invention, an inner casing 1 encloses a bread toasting chamber within it and has opposite end plates 2 mounted on a base plate 32. One of the end plates 2 has flanges thereon which are bent outwardly of the side plates of the inner casing 1 and are partially curled into cylindrical guides 3 for bread support elevating means generally indicating at 5. In the end plates 2 are guide slots 4 through which a part of a bread support 14 projects out of the bread toasting chamber. The bread support elevating means 5 comprises an elevating plate 9 having opposite edge portions bent into inwardly opening U-shaped channels 6, which are slidably mounted on the respective cylindrical guides 3. Lugs 8 project laterally outwardly of the plate 9 away from the inner casing, and a generally U-shaped hinge and engaging member 7 has one leg pivoted in said lugs 8. A push lever 11 is pivotally supported by the said one leg of the engaging member 7 and has a bent lug 10 thereon which abuts the elevating plate 9. A spring 12 on the said one leg of the engaging member 7 engages the push lever 11 and tends to swing it around the one leg of the engaging member 7 in the depressing direction and also biases the other leg of the engaging member 7 outwardly. A stop 13 for limiting the outward movement of the engaging member 7 is mounted on the elevating plate 9. Bread support levers 14 are also mounted on plate 9 and extend through the guide slots 4 into the bread toasting chamber. The elevating means 5 is normally urged upwardly by a spring 15 connected between the end plate 2 and one of the bread support levers.

Latch means 16 is provided for latching the bread support elevating means in the toasting position and is composed of a base plate 20 having a stop 19 thereon to limit the outward movement of the engaging member 7, a rebound leaf spring 21 attached to said base plate 20, and which snaps between two positions. The latch means 16 also includes a latch member 24 pivotally mounted on lateral projections on the base plate 20. Latch member 24 has a hook 22 thereon for engagement with the engaging member 7, and also has a bent lug 23 which abuts against the rebound spring 21. A spring 25 is connected between an ear on the latch member 24 and an ear on the base plate 20 for biasing the latch member 24 inwardly toward the base plate. An operating strip 26 is mounted on two projections on the latch member 24 and presses against said rebound spring 21 movable outwardly and inwardly between the base plate 20 and a stop 27 which limits the outward displacement of the rebound spring 21. Indicated at 28 is a toasting control means which is composed of an adjusting screw 29 movable in a threaded sleeve 30 on a bracket 17 attached to end plate 2 in order to displace the base plate 20 against the bias of a leaf spring 18 on the back of base plate 20, which spring 18 bears against end plate 2. Thus, the degree of toasting of the bread is controlled by varying the space between the rebound spring 21 and an actuating rod 31 operatively associated with a bimetallic element 31a supported on a fixed member 31b and which is deflected as the toasting proceeds, the space being changed by rotating the adjusting screw 29.

The toaster operates in the following manner. When the elevating means 5 is brought into the bread toasting position by manually depressing the push lever 11, the operating member 26 is urged inwardly by the lower edge of the elevating plate 9, causing the rebound spring 21 to snap into an inverted position beyond its dead center point. As a result, the latch member 24 pivots under the bias of the spring 25, and the hook 22 latching over the engaging member 7. Thus the elevating means 5 is retained in the toasting position. As the toasting proceeds, the bimetallic element is deflected and this deflection is transmitted to the actuating rod 31 causing said actuating rod to push the rebound spring 21. As that portion of the rebound spring 21 which is being pushed by the actuating rod 31 moves past the dead center point, the rebound spring is snapped back against the bias of the spring 25. Consequently, the latch member 24 is turned, being pushed by the bent lug 23 which is engaged by the rebound spring 21, and therefore the hook 22 is disengaged from the engaging member 7, permitting the elevating means 5 to return to the non-toasting position under the action of the spring 15. When it is desired to return the elevating means 5 to the non-toasting position prior to the snapping back of the rebound spring 21 caused by the deflection of the bimetallic element, the push lever 11 is lifted slightly, whereupon the bent lug 10 on the push lever 11 knocks the hook 22 of the latch member 24 outwardly, causing the latch member 24 to rotate and thus releasing the engaging member 7 from the hook 22 and permitting the return movement of the elevating means 5.

Suitable means (not shown) is provided so that connection or disconnection of the toasting heater element to or from a power source is effected by movement of the elevating means 5.

As described previously, the operating member 26 in front of the rebound spring 21 is moved laterally toward the rebound spring 21 by the lower edge of the elevating plate 9 during the downward movement of the elevating means 5 to the toasting position, and the rebound spring 21 is snapped into the inverted position during this movement. The point at which the elevating means 5 is latched by the latch means 16 is designed to be located slightly above the point at which the elevating plate 9 depresses the operating member 26, so that the displacement of the operating member caused by the snapping back of the rebound spring 21 upon completion of the toasting is not blocked by the elevating plate 9.

The toaster of this embodiment has the advantage that, since an extensible and contractable resistance wire is not used as is the case in conventional toasters, it is free from any and all drawbacks due to the use of said wire and, in addition, since disengagement of the engaging member of the elevating means from the hook of the latch means is effected by the bouncing movement of the rebound spring having a dead center point, not only is it possible to obtain a positive operation of the toaster but also the construction of the toaster as a whole can be simplified. Another advantage is that, since the position of the dead center point of the rebound spring can be adjusted easily by the toasting control means, the adjustment is simple as compared with the adjustment of the conventionally used extensible and contractable wire, and accordingly the productivity of the toaster can be enhanced. Still another advantage of the present toaster is that, since the flanges of the end plate of the inner casing are bent over and curled to provide cylindrical guides 3, there is no need to provide separate guide rods as in the conventional toasters, so that the air space around the inner casing can be utilized efficiently.

Another embodiment of the invention will be described with reference to FIGS. 5 and 6. An inner casing 101 encloses a bread toasting chamber therein and has opposite end plates 102, which are mounted on a base plate 103. On one end plate 102 are provided guide rods 104 on which elevating means 105 is mounted for vertical sliding movement while being guided by said guide rods, said elevating means 105 carrying a bread support 106 disposed in the bread toasting chamber. The elevating means 105 is normally urged upwardly by means of a spring 107 mounted between it and the top portion of the end plate 102. During the toasting operation, the elevating means 105 is retained in the toasting position by latch means 108 and the position at which the elevating means is released from the latch means is adjusted by adjusting means 109. At the lower portion of the other end plate 102 opposite to the elevating means 105, there is provided a switch 110 which is mounted on the end plate 102, with an insulator 111 intervening therebetween. An actuating lever 112 having offset end portions has one end connected to the elevating means 105, while the other end thereof projects outwardly of the toasting chamber through the end plate 102 and is provided with an insulating member 113 which is adapted to abut against the switch 110. The guide rods 104, elevating means 105, and latch means 108 can all be as shown and described above with reference to FIGS. 1–4.

When a slice of bread is placed on the bread support 106 and the elevating means 105 is manually moved from the position shown in FIG. 4 to the toasting position shown in FIG. 6, the actuating lever 112 connected to the elevating means 105 is displaced to the right as viewed in the figures, moving the switch 110 into a closed position.

According to the construction described above, it is possible by the provision of the actuating lever 112 extending through the opposite end plates 102 of the inner casing 101 to dispose the switch 110 at the end opposite to that at which the elevating means 105 is provided. This is advantageous in that concentration of the operational elements of the toaster at one end thereof as is done in conventional toasters can be avoided and therefore the design work is made easy and the assembling is facilitated. Such an arrangement is also preferable from the standpoint of design and convenience in the use of the toaster and furthermore eliminates illogical wiring.

It is believed that the construction and advantages of the toaster of the present invention will be apparent to those skilled in the art from the foregoing description. Although preferred embodiments of the invention have been described and illustrated for the purpose of explanation, it is to be understood that various changes and modifications may be made therein without departing from the scope of the invention as defined in the appended claims.

What is claimed is:

1. A toaster comprising bread support elevating means having an engaging member thereon and movable up and down between an elevated position and a lower toasting position, latch means having a hook thereon engageable with said bread support elevating means when it is in said lower toasting position for retaining it in said positon, a rebound spring adapted to snap back and forth past a dead center position, said rebound spring being engaged by said latch means to move it in one direction past said dead center position when said bread support elevating means is lowered toward said lower toasting position, a bimetallic element for detecting the degree of toasting of bread toasted by the toaster, an actuating rod coupled to said bimetallic element and engageable with said rebound spring to snap it back in the other direction past the dead center position as said bimetallic element moves in response to the degree of toasting, said rebound spring and latch means being positioned so that the latch means is engaged by said rebound spring and disengaged from said bread support elevating means when said rebound spring snaps back in said other direction, whereby said bread support elevating means is released to permit its return to the elevated position.

2. A toaster as claimed in claim 1 in which said toaster has an inner casing with opposite end walls, and said latch means and said bread support elevating means are provided on the outside of one of said end walls, said bread support elevating means having a bread support extending into the interior of said inner casing, switch means on the outside of the other of said end walls, and an actuating lever coupled to said bread support elevating means and said switch means and extending through the interior of said inner casing.

3. A toaster as claimed in claim 1 which includes an inner casing having end walls, one of said end walls having vertical flanges thereon bent outwardly and curled to form cylindrical guides, and in which said bread support elevating member has inwardly facing U-shaped channels thereon slidably engaging said cylindrical guides, whereby said guides guide said bread support elevating means in its vertical movement.

4. A toaster as claimed in claim 1 in which said latch means comprises an actuating member abutting said rebound spring for moving it in said one direction past said dead center position, said bread support elevating member engaging said actuating member and moving it and said rebound spring in said one direction as said bread support elevating member is moved downwardly to the toasting position, and a stop on said latch means engageable by said rebound spring when it snaps in said other direction to move said latch means out of engagement with said bread support elevating member.

References Cited

UNITED STATES PATENTS 2,563,755   8/1951   Sutton et al. _____ 99—329
2,950,668   8/1960   Blixrud et al. _____ 99—329

BILLY J. WILHITE, *Primary Examiner.*